J. S. FOSTER.

MACHINE FOR TWISTING HAY FOR FUEL.

No. 7.639. Reissued April 24, 1877.

WITNESSES

M. F. Utley

F. J. Mast

INVENTOR

James S. Foster by E. W. Anderson

ATTORNEY

UNITED STATES PATENT OFFICE.

JAMES S. FOSTER, OF YANKTON, DAKOTA TERRITORY.

IMPROVEMENT IN MACHINES FOR TWISTING HAY FOR FUEL.

Specification forming part of Letters Patent No. 181,160, dated August 15, 1876; reissue No. 7,639, dated April 24, 1877; application filed December 9, 1876.

*To all whom it may concern:*

Be it known that I, JAMES S. FOSTER, of Yankton, in the county of Yankton and Territory of Dakota, have invented certain new and useful Improvements in Machines for Twisting Hay for Fuel; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
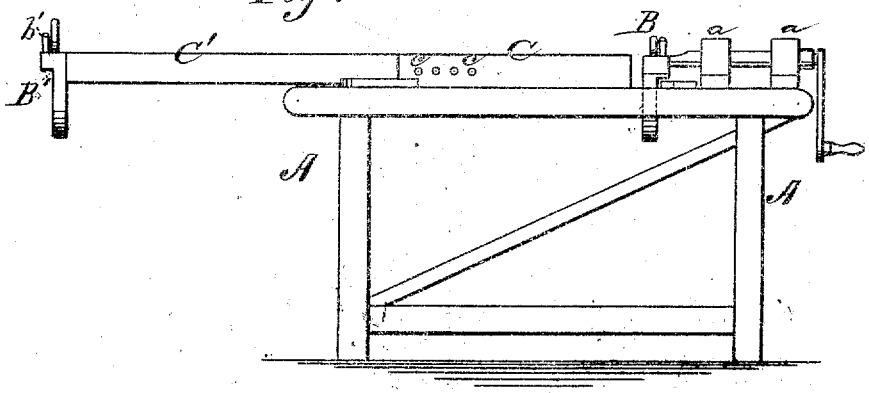
Figure 2:
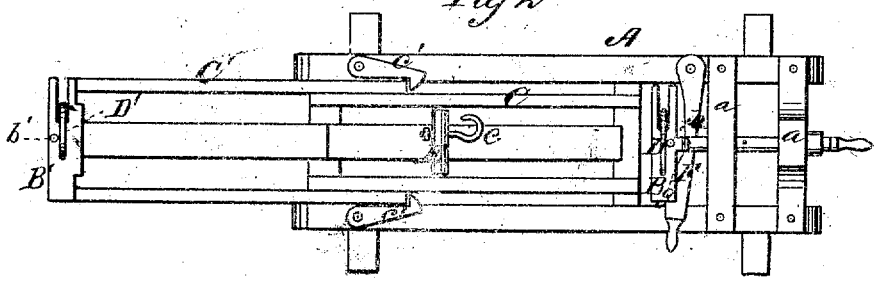

Figure 1 represents a side view, and Fig. 2 a plan view, of my hay-twisting machine.

My invention has relation to improvements upon the machine for which I have received Letters Patent No. 180,218; and it consists in the combination of a rotating head, carrying one end of the strand, and a latch for securing the strand to the head.

It also consists in the combination of a rotating hook, a sliding extensible frame carrying the fixed head, and devices for locking the said extensible frame and the rotating head, when required in the operation of the machine.

It also consists in combining, with the rotating head carrying one end of the strand, a rotating hook, into which the said strand is passed, whereby means are provided for twisting the free part of the said strand upon that which is stretched between the head and hook, when the free end of the said strand is held taut and rotation given to the head.

It also consists in the method of putting up hay in fagots, which consists in forming a continuous strand, which has its free part wound around a tense portion that has its end looped, and then in passing said free part through said loop, substantially as described.

In the accompanying drawing, A A indicate the frame of the machine, in whose transverse bars *a a* the shaft of the rotating head B has its bearings. This head is rotated by a crank-handle, in the usual manner, and works in front of the fixed portion C of the extensible frame. B′ represents the non-rotating head, rigidly secured to the sliding portion C′ of the frame, opposite the head B. The heads B B′ will be provided, respectively, with upright pins *b b′* on their upper surfaces, and with angular latches D D′, pivoted to the said heads, which latches will hold the strand to its engagement with the pins *b b′*.

In the frame, spaced holes *c c* will be arranged longitudinally, for the accommodation of a transverse bar, E, carrying a rotating hook, *e*, so that the length of the fagot may be increased or diminished at pleasure. This extension of the frame may be fixed, when drawn out, by catches *c′ c′*, engaging with its inner ends. F indicates a sliding lever, pivoted to one side of the frame of the machine, which fixes or locks the rotating head, when necessary, by engaging in the projection or shoulder *g* on the outer side of said head.

The operation of the machine is as follows: The sliding part of the extensible frame being drawn out and fixed by the catches *c′*, the strand of hay, spun out in sufficient length, is looped at each end over the pins *b b′*. Slight rotation is then given to head B, when the twisting action thus produced renders the loops permanent. The strand, being sufficiently twisted, is detached from the head B′, passed into hook *e*, and having been drawn taut, and its free end being held in the hand, the rotation of head B is continued. The portion between the hand and hook will, through the rotation of the latter and of the head, be twisted or wound around the portion which is stretched between the hook and head. The winding being complete, the looped end of the fagot is removed from pin *b* by swinging the latch D out of the way, and the free end of the strand passed through the looped end aforesaid and drawn tight. By this means a fagot is constructed which is incapable of unwinding, and is in close, compact form. During the operation of winding above described, the latch D prevents the looped end of the strand from falling off pin *b* when, from the rotation of the head, the pin aforesaid is turned under the same.

What I claim as new, and desire to secure by Letters Patent, is—

1. In a machine for twisting hay for fuel, the combination of the extensible frame C C′, twisting-heads B B′, and the adjustable rotating hook *e*, substantially as and for the purpose set forth.

2. In a machine for twisting hay for fuel, the combination of the extensible frame C C′, twisting-heads B B′, upright pins *b b′*, and latches D D′, substantially as specified.

3. In a machine for twisting hay for fuel, the combination, with the rotating head B, having shoulder *g*, of the lever F, substantially as specified.

4. In a machine for twisting hay for fuel, the combination, with a rotating head, B, of a rotating hook, *e*, substantially as specified.

5. The method of putting up hay in fagots, which consists in forming a continuous strand, which has its free part wound around a tense portion that has its end looped, and then in passing said free part through said loop, substantially as specified.

6. In a machine for twisting hay for fuel, the combination, with a rotating head having a looper-pin, *b*, of a latch adapted to hold the strand upon the pin, substantially as specified.

In testimony that I claim the foregoing I have hereunto set my hand this 30th day of November, 1876.

JAMES S. FOSTER.

Witnesses:
M. D. GARDNER,
H. J. GARDNER.